US012707403B2

(12) United States Patent
Hwang

(10) Patent No.: US 12,707,403 B2
(45) Date of Patent: Aug. 11, 2026

(54) METHOD AND APPARATUS FOR INCREASING TRANSMIT POWER IN A SUB-TERAHERTZ COMMUNICATION SYSTEM

(71) Applicant: MEDIATEK INC., Hsin-Chu (TW)

(72) Inventor: Chien-Hwa Hwang, Hsin-Chu (TW)

(73) Assignee: MEDIATEK INC., Hsinchu City (TW)

( * ) Notice: Subject to any disclaimer, the term of this patent is extended or adjusted under 35 U.S.C. 154(b) by 115 days.

(21) Appl. No.: 17/982,426

(22) Filed: Nov. 7, 2022

(65) Prior Publication Data

US 2023/0180149 A1 Jun. 8, 2023

Related U.S. Application Data

(60) Provisional application No. 63/284,692, filed on Dec. 1, 2021.

(51) Int. Cl.

*H04W 52/36* (2009.01)
*H04B 7/06* (2006.01)
*H04L 5/00* (2006.01)
*H04W 52/42* (2009.01)

(52) U.S. Cl.

CPC ........ *H04W 52/367* (2013.01); *H04B 7/0613* (2013.01); *H04L 5/001* (2013.01); *H04W 52/42* (2013.01)

(58) Field of Classification Search

CPC .... H04L 5/001; H04B 7/0613; H04W 52/367; H04W 52/42

See application file for complete search history.

(56) References Cited

U.S. PATENT DOCUMENTS

2016/0204822 A1* 7/2016 Yu ..................... H04L 27/26416 375/219
2016/0218425 A1* 7/2016 Mohamadi ......... H01Q 21/0031
2018/0139036 A1* 5/2018 Islam .................. H04W 56/001
2019/0173537 A1* 6/2019 Cai ...................... H04B 7/0608
2019/0363430 A1* 11/2019 Wang .................... G01S 13/931
2020/0145947 A1* 5/2020 Gheorghiu ........... H04B 17/336
2020/0337074 A1 10/2020 Papasakellariou .... H04W 72/12
2021/0144569 A1 5/2021 Zhou et al. ........... H04W 24/08
2021/0144745 A1* 5/2021 Yang ..................... H04W 72/23
2021/0212098 A1 7/2021 Yoon et al. ........... H04W 72/12
2021/0234593 A1* 7/2021 Raghavan ............ H04B 7/0623
2021/0250833 A1* 8/2021 Ioffe ..................... H04W 36/06

(Continued)

FOREIGN PATENT DOCUMENTS

CN 112189374 A 3/2019

OTHER PUBLICATIONS

Taiwan IPO office action and search report for application 111145861, dated on Feb. 24, 2023, 6 pages.

*Primary Examiner* — Raymond S Dean

(74) *Attorney, Agent, or Firm* — Helen Mao; Zheng Jin; Imperium Patent Works

(57) ABSTRACT

Method and apparatus are provided for increasing transmit power in a sub-terahertz (sub-THz) communication system. An apparatus can determine a plurality of component carriers in a single frequency band. The single frequency band comprises an intra-band. The apparatus can configure a plurality of antenna arrays to serve the plurality of component carriers. The apparatus can transmit an output signal on the plurality of component carriers via the plurality of antenna arrays simultaneously.

16 Claims, 6 Drawing Sheets

(56) References Cited

U.S. PATENT DOCUMENTS

| | | | | |
|---|---|---|---|---|
| 2022/0030525 | A1* | 1/2022 | Chincholi | H04B 17/14 |
| 2022/0167333 | A1* | 5/2022 | Raghavan | H04B 7/088 |
| 2023/0254052 | A1* | 8/2023 | Haustein | H04B 17/16 |
| | | | | 343/702 |

* cited by examiner

METHOD AND APPARATUS FOR INCREASING TRANSMIT POWER IN A SUB-TERAHERTZ COMMUNICATION SYSTEM

CROSS REFERENCE TO RELATED APPLICATIONS

This application claims priority under 35 U.S.C. § 119 from U.S. Provisional Application No. 63/284,692, entitled "Multi-channel Sub-THz System," filed on Dec. 1, 2021, the subject matter of which is incorporated herein by reference.

TECHNICAL FIELD

The disclosed embodiments relate generally to wireless communication, and, more particularly, to method and apparatus for increasing transmit power in a sub-terahertz (sub-THz) communication system.

BACKGROUND

In conventional wireless communication systems such as 3rd generation partnership project (3GPP) 5G new radio (NR), the operation frequency bands are under 100 gigahertz (GHz). For example, Frequency Range 1 (FR1) includes sub-6 GHz frequency bands and Frequency Range 2 (FR2) includes frequency bands from 24.25 GHz to 71.0 GHz. Under such frequency bands, the maximum transmit power of a transmitter (e.g., user equipment) is about 200 milliwatt (mW) which is 23 dBm. Such transmit power level in lower frequency bands (e.g., under 100 GHz) can be accomplished by current hardware components (e.g., a power amplifier).

For a future communication system operated in higher frequency bands including sub-THz (e.g., 100 GHz to 200 GHz), the maximum transmit power of a transmitter could be raised to a higher level (e.g., 10 watt). However, current hardware components (e.g., a power amplifier) cannot support/reach such high transmit power level under sub-THz frequency bands. One of the challenges for a sub-THz communication system would be the limited output power of a power amplifier due to the physical limit of integrated circuit (IC) technology in a high radio frequency. For example, regulation rules may allow a maximum transmit power of 10 watt, but a maximum output power of an antenna array is only 2.5 watt. The power resource of the wireless system will not be fully utilized and the power spectral density of the transmit signal is relatively low that may cause reception failure at the receiver side.

Therefore, how to increase transmit power for an apparatus operated in higher frequency bands (e.g., sub-THz) becomes an important issue in a newly developed communication system (e.g., 6G). Thus, there is a need to provide proper schemes to increase/boost transmit power level based on current hardware components/IC technologies.

SUMMARY

Method and apparatus are provided for increasing transmit power in a sub-THz communication system. In particular, an apparatus can determine a plurality of component carriers in a single frequency band. The single frequency band comprises an intra-band. The apparatus can configure a plurality of antenna arrays to serve the plurality of component carriers. The apparatus can transmit an output signal on the plurality of component carriers via the plurality of antenna arrays simultaneously.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
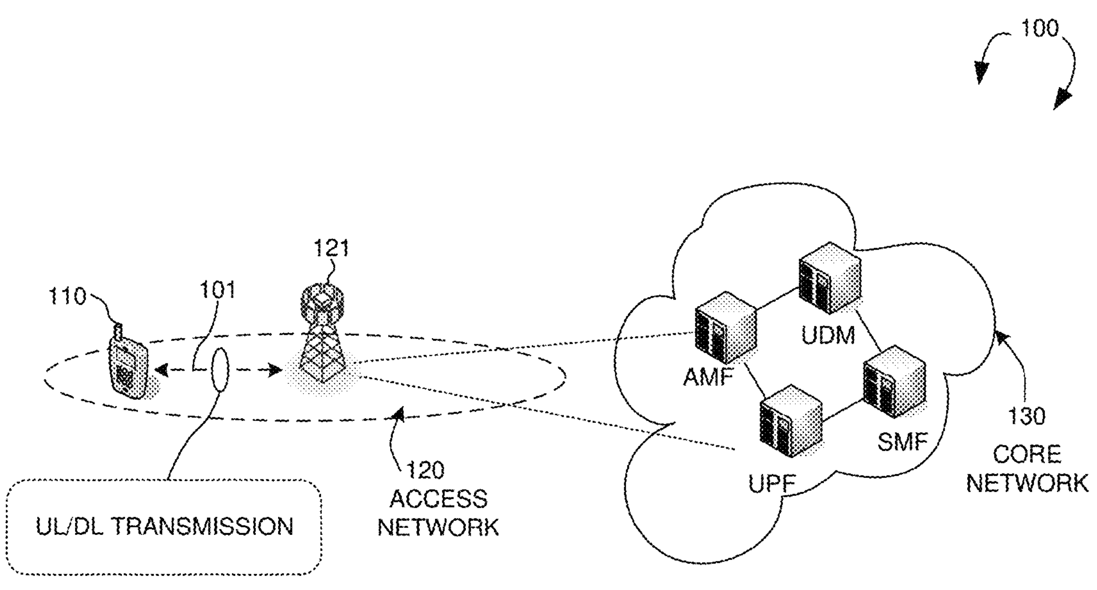
FIG. 1 illustrates an exemplary wireless communication network for increasing transmit power in accordance with embodiments of the current invention.

FIG. 1 illustrates an exemplary wireless communication network 100 (e.g., 6G network) supporting transmit power enhancement in accordance with aspects of the current invention. The 6G network 100 includes a user equipment (UE) 110 communicatively connected to a base station (BS) 121 operating in a licensed band (e.g., 30 GHz~300 GHz) of an access network 120 which provides radio access using a Radio Access Technology (RAT). The access network 120 is connected to a core network 130 by means of the NG interface, more specifically to a User Plane Function (UPF) by means of the NG user-plane part (NG-u), and to a Mobility Management Function (AMF) by means of the NG control-plane part (NG-c). One base station can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The BS 121 may provide communication coverage for a geographic coverage area in which communications with the UE 110 is supported via a communication link 101. The communication link 101 shown in the 6G network 100 may include UL transmissions from the UE 110 to the BS 121 (e.g., on the Physical Uplink Control Channel (PUCCH) or Physical Uplink Shared Channel (PUSCH)) or downlink (DL) transmissions from the BS 121 to the UE 110 (e.g., on the Physical Downlink Control Channel (PDCCH) or Physical Downlink Shared Channel (PDSCH)).

Figure 2:
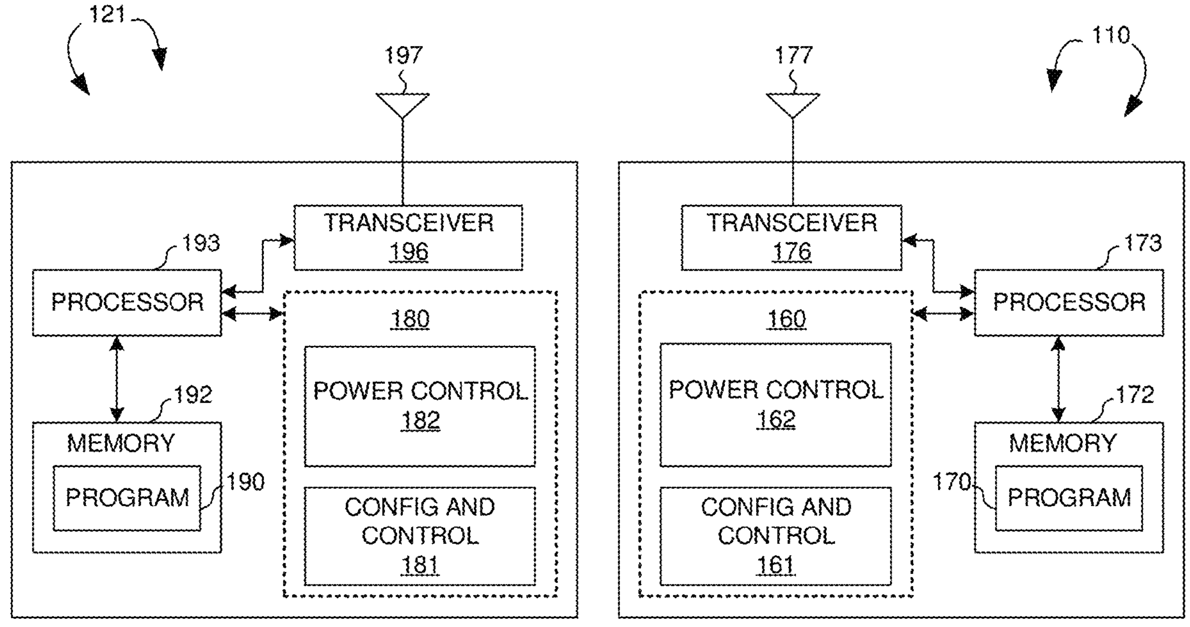
FIG. 2 is a simplified block diagram of the BS and the UE in accordance with embodiments of the current invention.

FIG. 2 is a simplified block diagram of the BS 121 and the UE 110 in accordance with embodiments of the present invention. For the BS 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Transceiver 196 and antenna 197 may constitute an antenna array. Processor 193 processes the received baseband signals and invokes different functional modules and circuits to perform features in the BS 121. Memory 192 stores program instructions and data 190 to control the operations of the BS 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Transceiver 176 and antenna 177 may constitute an antenna array. Processor 173 processes the received baseband signals and invokes different functional modules and circuits to perform features in the UE 110. Memory 172 stores program instructions and data 170 to control the operations of the UE 110.

The BS 121 and the UE 110 also include several functional modules and circuits that can be implemented and configured to perform embodiments of the present invention. In the example of FIG. 2, the BS 121 includes a set of control functional modules and circuit 180. Power control circuit 182 handles downlink transmit power. Configuration and control circuit 181 provides different parameters to configure and control the UE 110. The UE 110 includes a set of control functional modules and circuit 160. Power control circuit 162 handles uplink transmit power. Configuration and control circuit 161 handles configuration and control parameters from the BS 121.

Note that the different functional modules and circuits can be implemented and configured by software, firmware, hardware, and any combination thereof. The function modules and circuits, when executed by the processors 193 and 173 (e.g., via executing program codes 190 and 170), allow the BS 121 and the UE 110 to perform embodiments of the present invention.

Figure 3:
FIG. 3 illustrates one exemplary scenario under schemes in accordance with embodiments of the current invention.
Figure 3:
Figure 3:
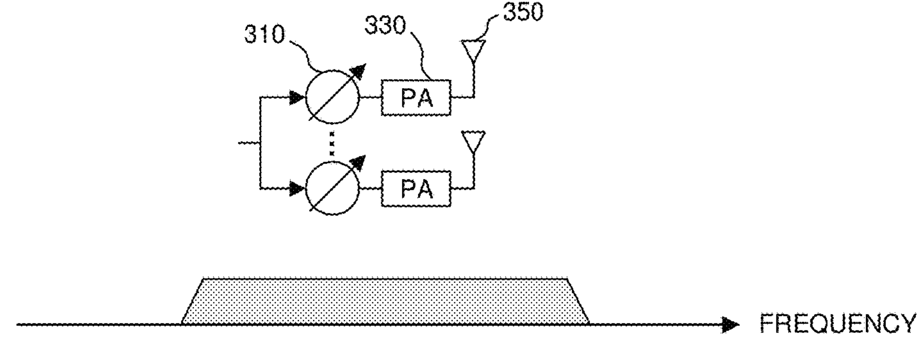

FIG. 3 illustrates an exemplary scenario under schemes in accordance with embodiments of the present disclosure. FIG. 3 shows a simplified radio frequency (RF) front-end circuit comprising an antenna array for signal transmission. In particular, the RF front-end circuit may comprise, but not limited to, a plurality of phase shifters. Each phase shifter may be electrically coupled to a power amplifier (PA). Each PA may be further electrically coupled to an antenna. The antenna array may be composed of the phase shifters, the PAs and the antennas.

Conventionally, within a single frequency band (e.g., an intra-band) or a single channel, the UE is configured to transmit the uplink signal by using one antenna array. In a lower frequency band (e.g., under 100 GHz), the maximum transmit power can be easily accomplished by one antenna array. However, one of the challenges for a sub-THz communication system is the limited output power of a PA due to the physical limit of integrated circuit (IC) technology in a high radio frequency. Referring to the scenario shown in FIG. 3, the regulation rules allow a maximum transmit power of 10 watt. The power limit in higher frequency bands could be large (e.g., 55 dBm). But the maximum output power of an antenna array is only 2.5 watt (e.g., equivalent isotropic radiated power (EIRP) is 2.5 watt). Thus, the power resource of the wireless system is not fully utilized and the power spectral density of the transmit signal is relatively low.

Figure 4:
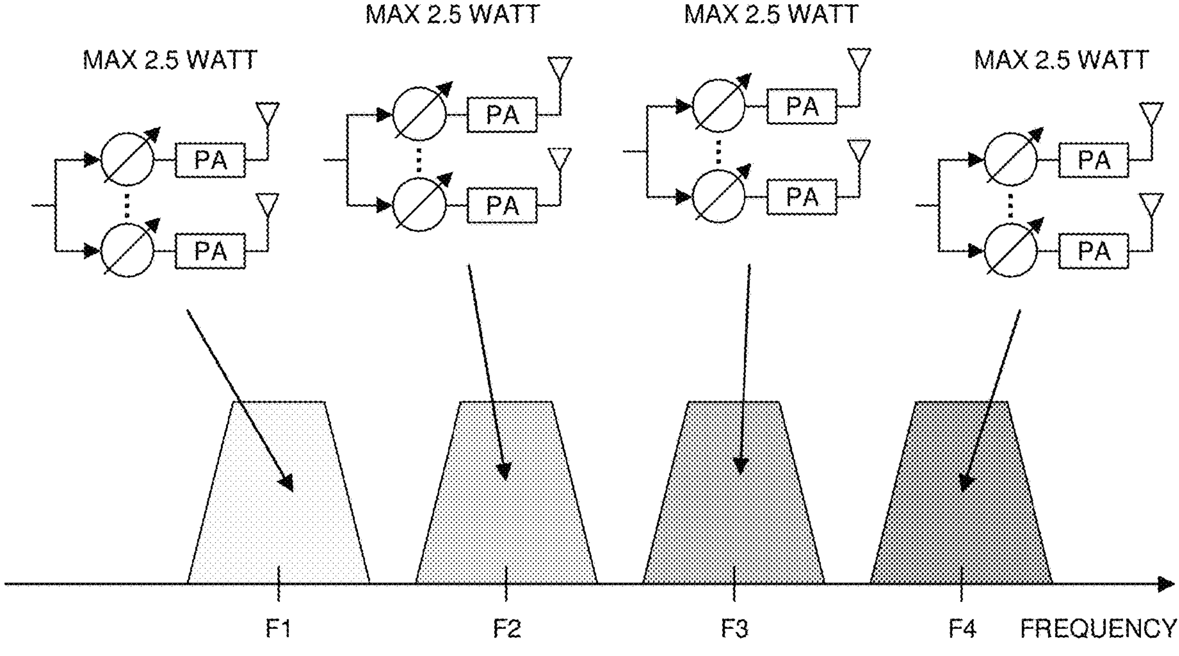
FIG. 4 illustrates one embodiment of increasing transmit power in accordance with embodiments of the current invention.

FIG. 4 illustrates one embodiment of increasing transmit power in accordance with one novel aspect. The aforementioned situation that the power resource is under-utilized can be overcome if the frequency/channel bandwidth is sub-divided into several component carriers/sub-bands/sub-channels and a 2.5 watt antenna array is used for each component carrier/sub-band/sub-channel. As shown in FIG. 4, one single frequency band/channel is divided into multiple component carriers/sub-bands/sub-channels (e.g., 4 component carriers/sub-bands/sub-channels from f1 to f4). Each component carrier/sub-band/sub-channel is served by one antenna array respectively. Each antenna array can transmit 2.5 watt output power which is lower than the regulation maximum transmit power (e.g., 10 watt). In such case, the output power of each antenna array can be accumulated. The transmit power of the output signal comprises the aggregated transmit power from the plurality of antenna arrays (e.g., 4×2.5 watt=10 watt). Accordingly, the 10 watt power resource is fully utilized and the power spectral density of the transmit signal becomes higher.

Specifically, the UE may be configured to determine a plurality of component carriers/sub-band/sub-channel in a single frequency band. The single frequency band is an intra-band. The UE may configure a plurality of antenna arrays to serve the plurality of component carriers/sub-bands/sub-channels. Each antenna arrays may comprise a plurality of phase shifters, PAs and antennas. The UE may transmit an output signal on the plurality of component carriers/sub-bands/sub-channels via the plurality of antenna arrays simultaneously.

Such scheme of transmission is called multi-channel sub-THz communication system. Owing to a reduced bandwidth of a sub-band/sub-channel, the benefits of a multi-channel sub-THz communication system may comprise at least one of that the beam squint effect is disappeared, the digital-to-analog converter (DAC) and the analog-to-digital converter (ADC) requirements are relaxed, the issue of limited PA output power is relieved, the Complementary Metal-Oxide-Semiconductor (CMOS) with low cost and high integration capability can still be used, the beamforming gain requirement for a sub-THz system to compensate for a low transmit power and large propagation loss is relaxed, and the channel equalization becomes easier.

The limit of output power of a PA is not the only challenge for the sub-THz communication system. The very wide bandwidth also imposes strict requirements on the DAC and ADC. The beam squint effect of an antenna array is another issue to handle, which happens when the number of antenna elements is large, and the channel bandwidth is wide. Thus, we can see a reduction of the channel bandwidth is helpful to deal with several problems including at least the limited PA output power, DAC/ADC requirements and the beam squint effect. The determination of the bandwidth of a component carrier/sub-band/sub-channel and the number of component carriers/sub-bands/sub-channels to be served by an antenna array should jointly consider all the factors mentioned above.

Figure 5:
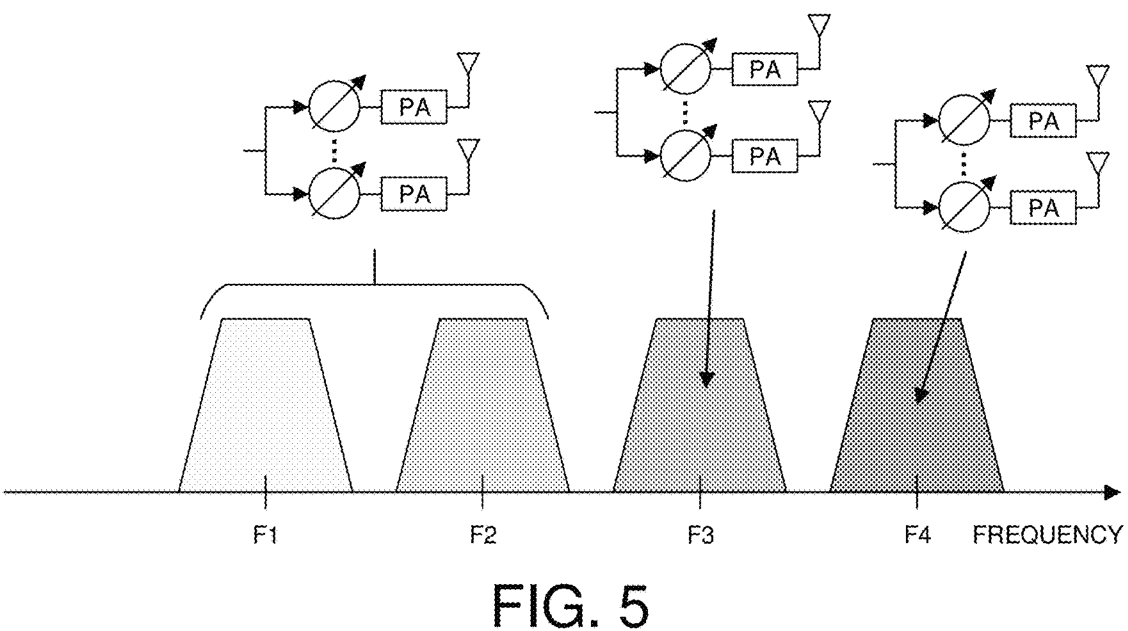
FIG. 5 illustrates one embodiment of increasing transmit power in accordance with embodiments of the current invention.

Except the embodiment that each component carrier/sub-band/sub-channel is served by an antenna array as shown in FIG. 4, other embodiments may also be used for the sub-THz communication system. FIG. 5 illustrates another embodiment of increasing transmit power in accordance with one novel aspect. One of the antenna arrays may be configured to serve multiple component carriers. For example, the component carrier/sub-band/sub-channel at frequency f1 and frequency f2 can be served by one transmit antenna array. The component carrier/sub-band/sub-channel at frequency f3 and frequency f4 can be served by two transmit antenna arrays respectively. This may be because the bandwidths of component carriers/sub-bands/sub-channels are narrower, or the capability of the antenna array is higher, or other design considerations.

Figure 6:
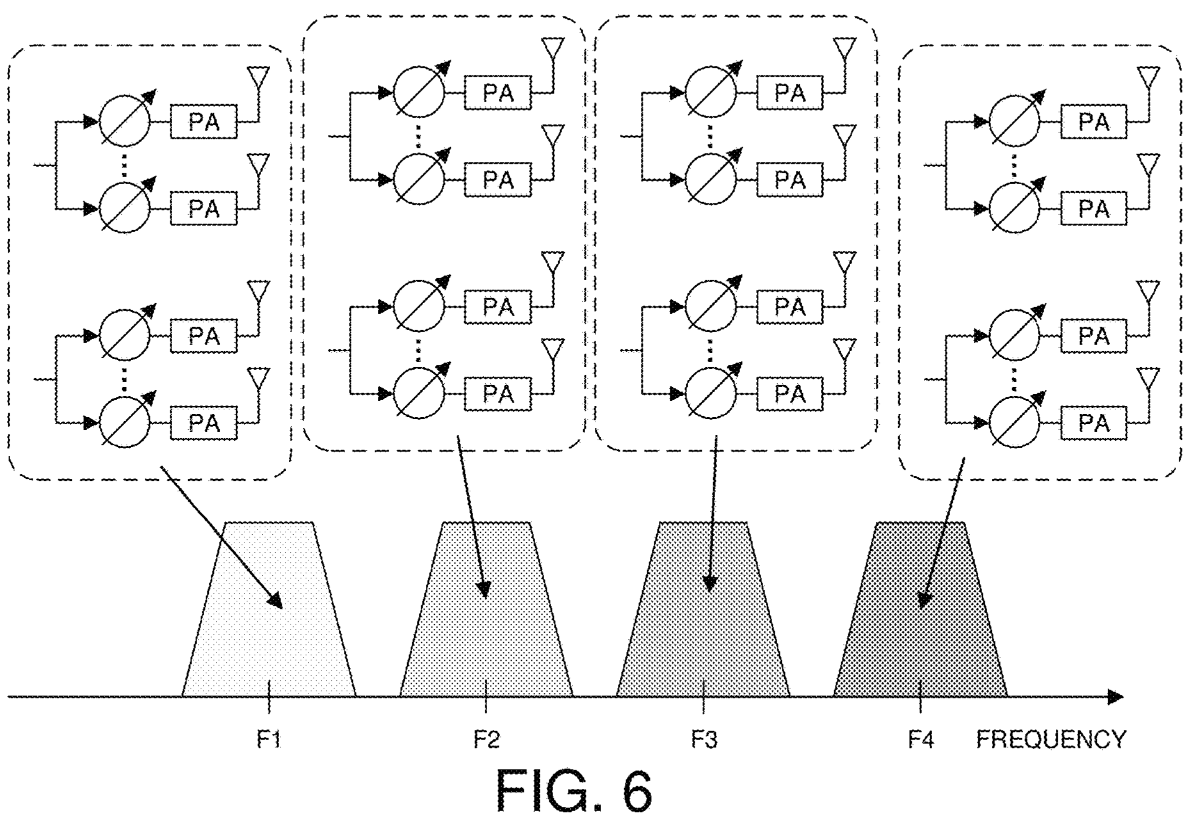
FIG. 6 illustrates one embodiment of increasing transmit power in accordance with embodiments of the current invention.

FIG. 6 illustrates another embodiment of increasing transmit power in accordance with one novel aspect. Multiple antenna arrays may be configured to serve one of the component carriers/sub-bands/sub-channels. For example, each of the component carrier/sub-band/sub-channel from frequency f1 to frequency f4 are served by multiple transmit antenna arrays for the purpose of supporting multiple data layers transmission or for coverage extension or other reasons.

Figure 7:
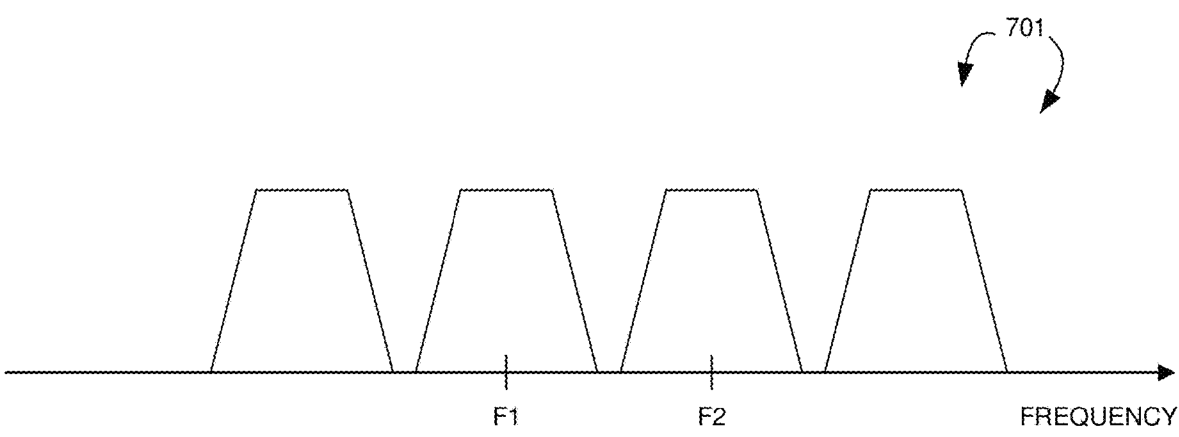
FIG. 7 illustrates several embodiments of multi-channel system design in accordance with embodiments of the current invention.
Figure 7:
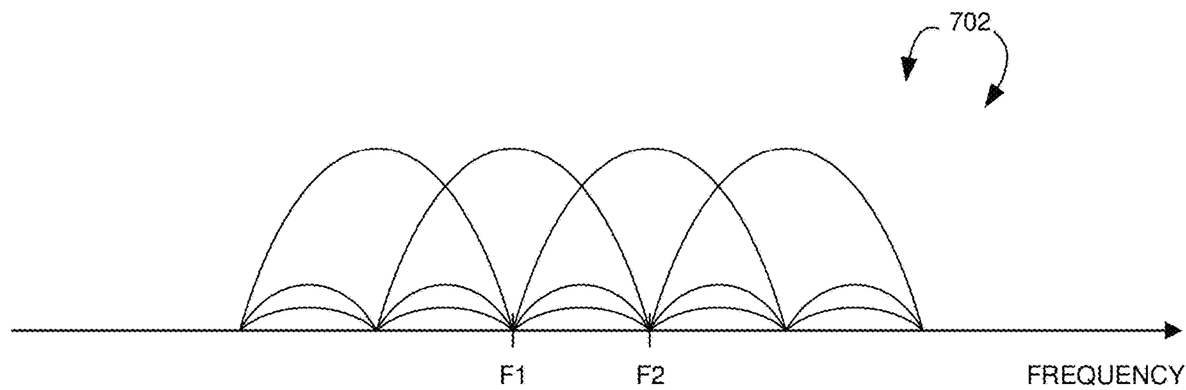
Figure 7:
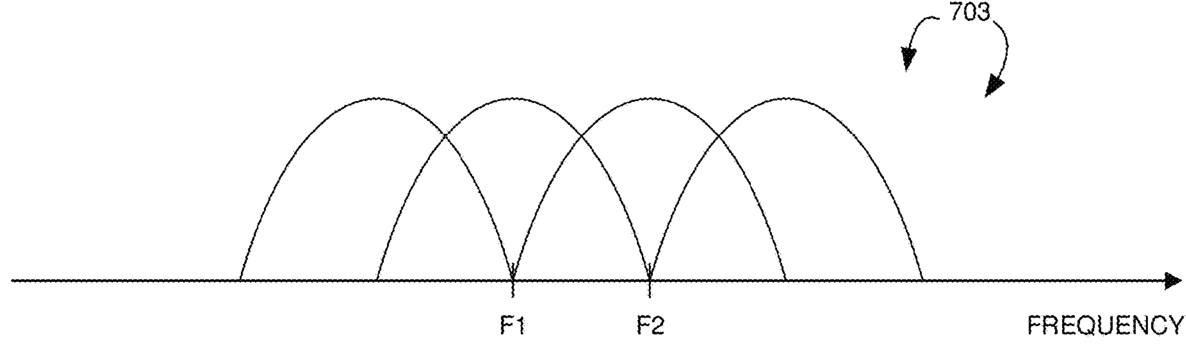

There are more than one way to design the multi-channel system. FIG. 7 illustrates several embodiments of multi-channel system design in accordance with one novel aspect. The multi-channel system may be designed such that the component carriers/sub-bands/sub-channels are not overlapped in the frequency domain. As shown in 701, the antenna arrays are configured to transmit the output signal on a plurality of non-overlapped frequency ranges within the single frequency band. Each component carrier/sub-band/sub-channel uses a frequency range which is separated from each other. The four frequency ranges are used for four component carriers/sub-bands/sub-channels. There is a guard band between two component carriers/sub-bands/sub-channels. The advantage of such design is that the interference between component carriers/sub-bands/sub-channels can be neglected. However, since guard bands are used to separate component carriers/sub-bands/sub-channels, there is some loss in the spectrum efficiency.

Another design is that the component carriers/sub-bands/sub-channels are overlapped in the frequency domain. Special handling must be taken in the system design to avoid the occurrence of interference between component carriers/sub-bands/sub-channels or to mitigate the interference at the receiver when the interference occurs. The benefit is that the spectrum efficiency can be increased. Under such spectrum design, for example, some design concept of the orthogonal frequency division multiplexing (OFDM) system and/or the filter bank multi-carrier (FBMC) system can be used.

For OFDM system, as shown in 702, each of the antenna arrays are configured to transmit the output signal by the OFDM modulation. The individual spectrum of the component carriers/sub-bands/sub-channels are the sine functions, and they are not band limited. With OFDM modulation, the signal can still be separated at the receiver side by the baseband signal processing. For FBMC system, as shown in 703, each of the antenna arrays are configured to transmit the output signal by the FBMC modulation. The individual spectrum of the component carriers/sub-bands/sub-channels are the square-root Nyquist pulses, and they are band limited. Each component carrier/sub-band/sub-channel overlaps only its immediate neighbors. The orthogonality of the component carriers/sub-bands/sub-channels can be maintained.

Figure 8:
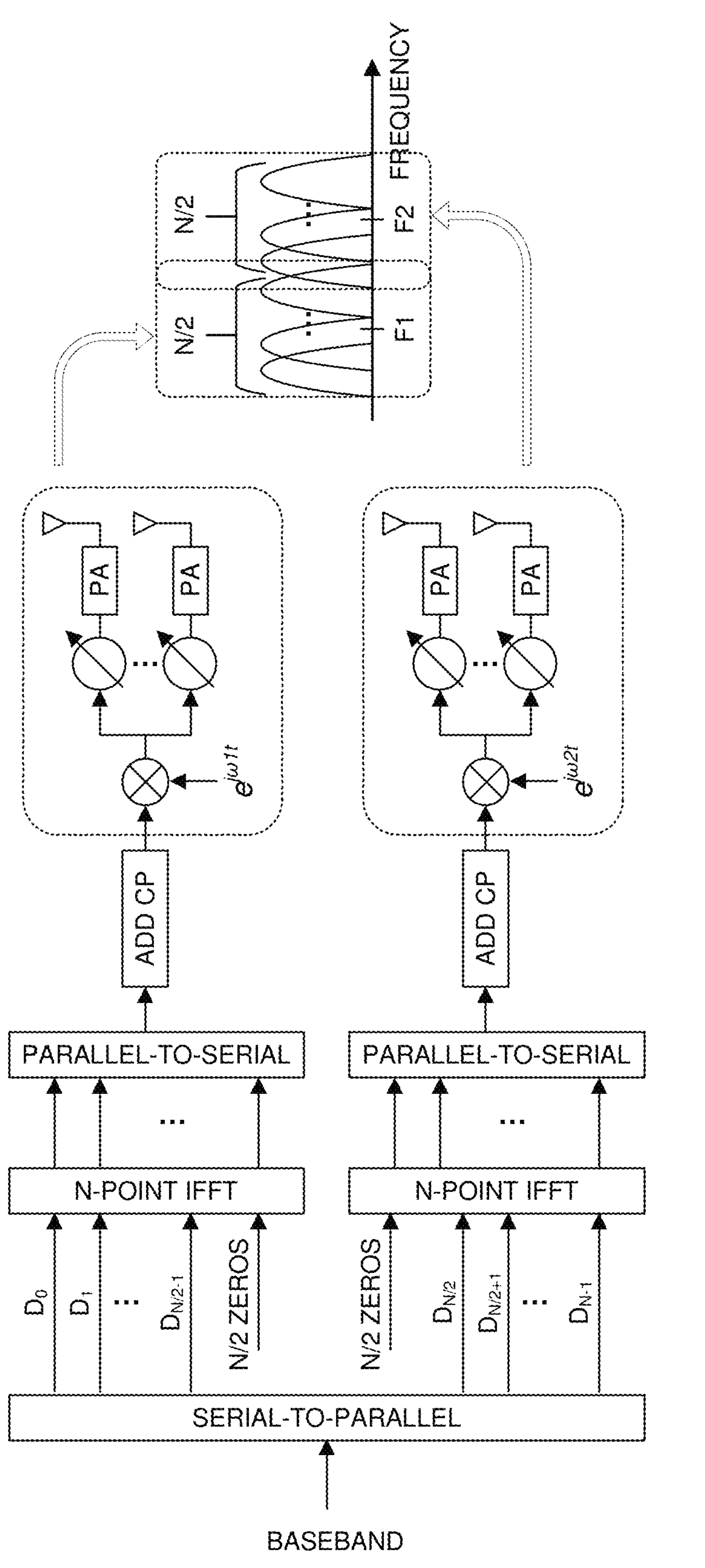
FIG. 8 illustrates one embodiment of multi-channel system based on OFDM design in accordance with embodiments of the current invention.

FIG. 8 illustrates one embodiment of multi-channel system based on OFDM design in accordance with one novel aspect. In this system design, there are N component carriers/sub-bands/sub-channels. The first N/2 component carriers/sub-bands/sub-channels and the last N/2 component carriers/sub-bands/sub-channels are served by different antenna arrays. The data symbol $D_i$, $0 \le i \le N-1$, are to be transmitted in the i-th component carrier/sub-band/sub-channel. The symbols $D_0, D_1, \ldots, D_{N/2-1}$ are post-appended by N/2 zeros and are passed to an N-point inverse fast Fourier transform (IFFT). For example, in a case that N=8, the sequence passed to the N-point IFFT is $\{D_0, D_1, D_2, D_2, 0, 0, 0, 0\}$. The symbols $D_{N/2}, D_{N/2+1}, \ldots, D_{N-1}$ are pre-appended by N/2 zeros are passed to an N-point IFFT. For example, in a case that N=8, the sequence passed to the N-point IFFT is $\{0, 0, 0, 0, D_4, D_5, D_6, D_7\}$.

After the N-point IFFT, the sequence is passed to a parallel-to-serial converter. Then, the sequence is further processed by adding cyclic prefix (CP) and passed to an RF mixer. The sequence of first N/2 component carriers/sub-bands/sub-channels is transmitted by a first antenna array. The sequence of last N/2 component carriers/sub-bands/sub-channels is transmitted by as second antenna array. In some embodiments, the N component carriers/sub-bands/sub-channels may be transmitted by more than two antenna arrays.

It should be noted that, in the conventional design, the N component carriers/sub-bands/sub-channels within one single band are transmitted by one antenna array only. The only one antenna array may comprise a vertical polarization antenna array and a horizontal polarization antenna array. In contrast, the N component carriers/sub-bands/sub-channels within one single band will be served by a plurality of antenna arrays according to the novel schemes proposed in the present disclosure.

In some embodiments, it is possible to implement an FBMC system using the discrete Fourier transform (DFT). A similar way of adding zeros to the input of IFFT as shown in FIG. 8 for OFDM can be applied to FBMC to serve the multi-channel system by multiple transmit antenna arrays.

Figure 9:
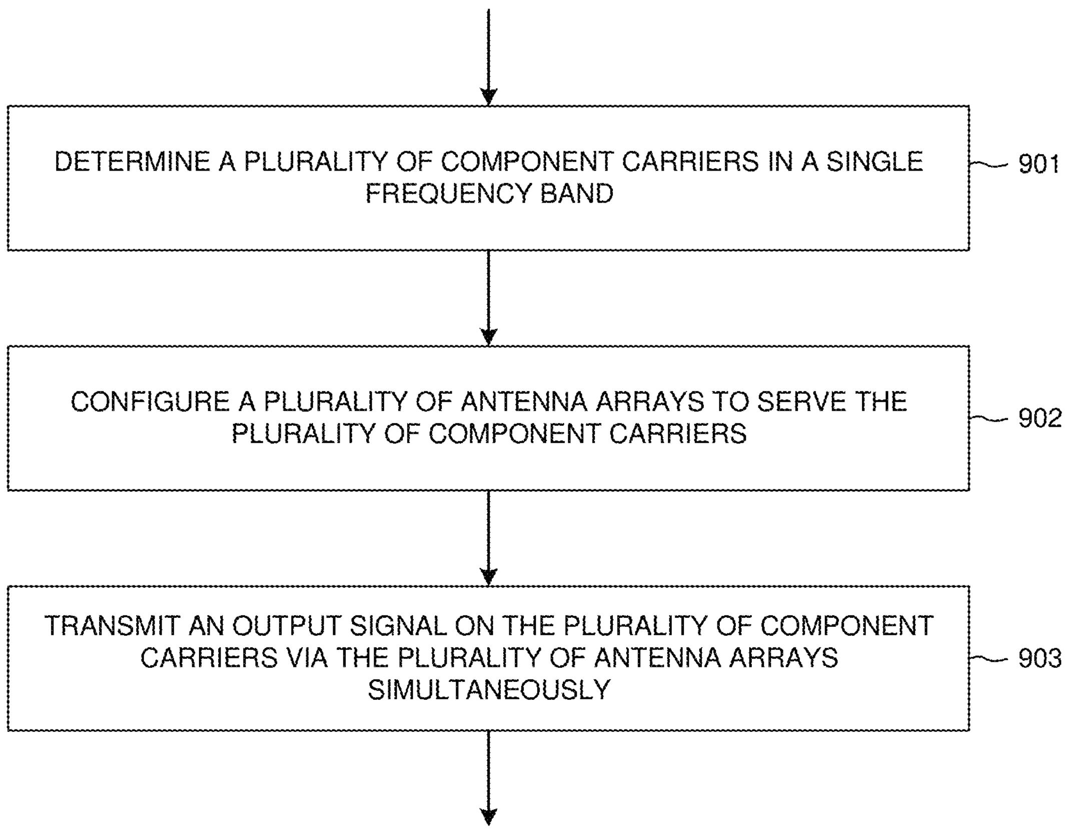
FIG. 9 is a flow chart of a method of increasing transmit power in accordance with embodiments of the current invention.

FIG. 9 is a flow chart of a method of increasing transmit power in a sub-THz communication system in accordance with one novel aspect. In step 901, an apparatus (e.g., a transmitter) determines a plurality of component carriers in a single frequency band. The single frequency band comprises an intra-band. In step 902, the apparatus configures a plurality of antenna arrays to serve the plurality of component carriers. In step 903, the apparatus transmits an output signal on the plurality of component carriers via the plurality of antenna arrays simultaneously.

In one implementation, a transmit power of the output signal comprises an aggregated transmit power from the plurality of antenna arrays. In one implementation, a maximum transmit power of each of the antenna arrays is lower than a regulation maximum transmit power.

In one implementation, one of the antenna arrays is configured to serve one of the component carriers. In one implementation, multiple antenna arrays are configured to serve one of the component carriers. In one implementation, one of the antenna arrays is configured to serve multiple component carriers.

In one implementation, the antenna arrays are configured to transmit the output signal on a plurality of non-overlapped frequency ranges within the single frequency band. In one implementation, each of the antenna arrays are configured to transmit the output signal by an OFDM modulation. In one implementation, each of the antenna arrays are configured to transmit the output signal by an FBMC modulation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

determining, by an apparatus, a plurality of component carriers in a single frequency band, wherein each component carrier occupies a sub-band of the single frequency band;

configuring, by the apparatus, a plurality of antenna arrays to serve the plurality of component carriers based on corresponding maximum transmit power of each antenna array and a regulatory maximum transmit power for the single frequency band, wherein each of the plurality of antenna arrays comprises one or more power amplifiers such that an aggregate transmit power contributed by the plurality of antenna arrays for transmissions on the plurality of component carriers does not exceed the regulatory maximum transmit power; and transmitting, by the apparatus, an output signal on the plurality of component carriers via the plurality of antenna arrays simultaneously.

2. The method of claim 1, wherein the single frequency band comprises an intra-band.

3. The method of claim 1, wherein one of the antenna arrays is configured to serve one of the component carriers.

4. The method of claim 1, wherein multiple antenna arrays are configured to serve one of the component carriers.

5. The method of claim 1, wherein one of the antenna arrays is configured to serve multiple component carriers.

6. The method of claim 1, wherein the antenna arrays are configured to transmit the output signal on a plurality of non-overlapped frequency ranges within the single frequency band.

7. The method of claim 1, wherein each of the antenna arrays are configured to transmit the output signal by an orthogonal frequency division multiplexing (OFDM) modulation.

8. The method of claim 1, wherein each of the antenna arrays are configured to transmit the output signal by a filter bank multi-carrier (FBMC) modulation.

9. An apparatus comprising:

a processor that:

determines a plurality of component carriers in a single frequency band, wherein each component carrier occupies a sub-band of the single frequency band; configures a plurality of antenna arrays to serve the plurality of component carriers based on corresponding maximum transmit power of each antenna array and a regulatory maximum transmit power for the single frequency band, wherein each of the plurality of antenna arrays comprises one or more power amplifiers such that an aggregate transmit power contributed by the plurality of antenna arrays for transmissions on the plurality of component carriers does not exceed the regulatory maximum transmit power; and a plurality of antenna arrays, each comprises one or more power amplifiers that:

transmit an output signal on the plurality of component carriers via the plurality of antenna arrays simultaneously.

10. The apparatus of claim 9, wherein the single frequency band comprises an intra-band.

11. The apparatus of claim 9, wherein the processor configures one of the antenna arrays to serve one of the component carriers.

12. The apparatus of claim 9, wherein the processor configures multiple antenna arrays to serve one of the component carriers.

13. The apparatus of claim 9, wherein the processor configures one of the antenna arrays to serve multiple component carriers.

14. The apparatus of claim 9, wherein the antenna arrays transmit the output signal on a plurality of non-overlapped sub-bands within the single frequency band.

15. The apparatus of claim 9, wherein each of the antenna arrays transmits the output signal by an orthogonal frequency division multiplexing (OFDM) modulation.

16. The apparatus of claim 9, wherein each of the antenna arrays transmits the output signal by a filter bank multi-carrier (FBMC) modulation.

* * * * *